United States Patent [19]

Pons et al.

[11] Patent Number: 5,100,955

[45] Date of Patent: Mar. 31, 1992

[54] COMPOSITION BASED ON AN AQUEOUS DISPERSION OF AN ADDITION POLYMER

[75] Inventors: Dick A. Pons, Maassluis; Johannes B. Van Hout, Rotterdam; Waltherus J. Sep, Doorn, all of Netherlands

[73] Assignee: DSM Resins B.V., Zwolle, Netherlands

[21] Appl. No.: 656,034

[22] Filed: Feb. 15, 1991

Related U.S. Application Data

[63] Continuation of Ser. No. 245,966, Sep. 16, 1988, abandoned, which is a continuation of Ser. No. 905,421, Sep. 9, 1986, abandoned.

[30] Foreign Application Priority Data

Sep. 10, 1985 [NL] Netherlands ............... 8502463

[51] Int. Cl.$^5$ .................... C08K 5/15; C08L 43/04
[52] U.S. Cl. .................... 524/832; 524/114; 524/262; 524/806
[58] Field of Search ............. 524/114, 262, 832, 806

[56] References Cited

U.S. PATENT DOCUMENTS

| 3,816,235 | 6/1974 | Lin | 524/265 |
|---|---|---|---|
| 4,077,932 | 3/1978 | Columbus | 524/114 |
| 4,101,490 | 7/1978 | Pons et al. | 524/710 |
| 4,110,285 | 8/1978 | Pons et al. | 524/710 |
| 4,291,095 | 9/1981 | Chase et al. | 524/114 |
| 4,439,494 | 3/1984 | Olson | 524/265 |
| 4,522,966 | 6/1985 | Funaki et al. | 524/114 |
| 4,590,230 | 5/1986 | Kamada et al. | 524/265 |
| 4,594,379 | 6/1986 | Funaki et al. | 524/114 |

FOREIGN PATENT DOCUMENTS 0018554 1/1985 Japan ........................ 524/265

OTHER PUBLICATIONS

Rhoplex LIC-67 Acrylic Emulsion for Plasticizer-Free Latex Caulks, Rhom and Haas Company, 1976, RC-83, Feb. 1976.

*Primary Examiner*—Joseph L. Schofer
*Assistant Examiner*—Jeffrey T. Smith
*Attorney, Agent, or Firm*—Cushman, Darby & Cushman

[57] ABSTRACT

The invention relates to a composition based on an aqueous dispersion of an addition polymer of one or more olefinically unsaturated monomers, emulsion stabilizers and/or emulsifiers and a silicon compound.

The addition polymer comprises monomer units containing acid groups and the silicon compound used is an epoxysilane with the formula

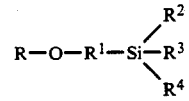

where
R = epoxyalkyl ($C_1$-$C_4$),
$R^1$ = alkyl ($C_1$-$C_4$) or phenyl,
$R^2$ = alkoxy ($C_1$-$C_4$), alkyl ($C_1$-$C_4$) or phenyl,
$R^3$ and $R^4$ = alkoxy ($C_1$-$C_4$) or OH The compositon can be applied in adhesives and coatings.

5 Claims, No Drawings

COMPOSITION BASED ON AN AQUEOUS DISPERSION OF AN ADDITION POLYMER

This is a continuation of application Ser. No. 07/245,966, filed on Sept. 16, 1988, which was abandoned upon the filing hereof, which in turn is a continuation of application Ser. No. 06/905,421, filed Sept. 9, 1986, also abandoned.

The invention relates to a composition based on an aqueous dispersion of an addition polymer of one or more olefinically unsaturated monomers, an emulsion stabilizer and/or emulsifier and a silicon compound. Optionally the composition may yet contain other usual additives.

In the Netherlands patent 173974 adhesives are described consisting of polymeric binding agents, fillers and water, in which the polymeric binding agents comprise certain alkoxysilane compounds. These silicon compounds are added during the polymerization and are incorporated in the polymer molecule. The silicon compounds hydrolize to form hydroxyl groups. The wet tensile strength of these adhesives is insufficient.

The object of the invention is to provide a composition based on an aqueous dispersion of an addition polymer of one or more olefinically unsaturated monomers, an emulsion stabilizer and/or emulsifiers and a silicon compound which adheres well to mineral and organic substrates, particularly also under wet conditions.

The composition according to the invention provides a solution to this problem and is characterized in that the addition polymer comprises monomer units containing acid groups and that the silicon compound used is an epoxysilane with the formula

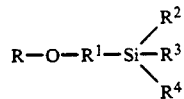

where
R = epoxyalkyl ($C_1$–$C_4$),
$R^1$ = alkyl ($C_1$–$C_4$) or phenyl,
$R^2$ = alkoxy ($C_1$–$C_4$), alkyl ($C_1$–$C_4$) or phenyl,
$R^3$ and $R^4$ = alkoxy ($C_1$–$C_4$) or OH.

According to a preferred embodiment of the invention, 0.1–5% (wt), preferably about 0.3–1.5% (wt), epoxysilane is used, based on the addition polymer.

According to a further preferred embodiment of the invention, the epoxysilane is added at a pH between 1.5 and 8, more specifically at a pH between 4 and 6.

Examples of suitable epoxysilane are particularly:
glycidoxyalkyl trialkoxysilanes,
glycidoxyphenyl trialkoxysilanes,
glycidoxyalkyl dialkoxyalkylsilanes,
glycidoxyphenyl dialkoxyalkylsilanes,
glycidoxyalkyl dialkoxyphenylsilanes,
glycidoxyphenyl dialkoxyphenylsilanes,
and glycidoxyphenyl dialkoxyalkylsilanes
and mixtures thereof.

According to a preferred embodiment of the invention, the epoxysilane used is an epoxysilane with the formula

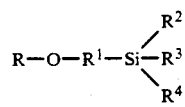

where
R = epoxyalkyl ($C_1$–$C_4$),
$R^1$ = alkyl ($C_1$–$C_4$),
$R^2$, $R^3$ and $R^4$ = alkoxy ($C_1$–$C_4$)

According to a further preferred embodiment of the invention, 3-glycidoxypropyltrimethoxysilane is used as epoxysilane.

In U.S. Pat. No. 4,032,487 and U.S. Pat. No. 4,077,932 compositions are described consisting of acrylate dispersions based on nitrogen containing monomers and epoxysilanes.

In the composition according to the invention, however, an entirely different addition polymer is used because the polymer contains no amino monomer. In addition, the epoxysilane according to the invention is added at a pH between 1.5 and 8 and at a temperature between 20° C. and 30° C. The present invention therefore relates to a simpler and cheaper composition.

Aqueous dispersions of addition polymers can be prepared via processes as described in the Netherlands patents 160278 and 161769.

The monomers used in the addition polymers according to the invention consist wholly or largely of monomers which do not contain any reactive groups other than the ethylenic unsaturation. Examples of these are the alkylacrylates, alkylmethacrylates, dialkylmaleates, dialkylfumarates, vinyl esters such as vinyl acetate, vinyl propionate, vinyl butyrate, vinyl pivalate, vinyl-2-ethylhexoate, vinyl stearate, vinyl laurate and/or vinyl versatate, vinyl ethers, vinyl chloride, alkenes such as ethylene, propylene or isobutene, butadiene, styrene, vinyltoluene, alphamethylstyrene or acrylonitrile. Mixtures of these monomers are also used. In many cases also monomers are used, in relatively small amounts, e.g. between 0.1 and 10% (wt), which, in addition to the ethylenic unsaturation, also contain other reactive groups such as carboxyl groups, sulphonic acid groups, phosphate groups, amide groups, hydroxyl groups, alkoxymethyl amide groups or epoxy groups. Examples of such monomers are acrylic acid, methacrylic acid, fumaric acid, maleic acid, crotonic acid, itaconic acid, hydroxyethylacrylate, hydroxyethylmethacrylate, hydroxypropylmethacrylate, ethyleneglycolmonoallylether, N-methylolacrylamide, N-methylolmethacrylamide, n-butoxymethylacrylamide, acrylamidopropanesulphonic acid, n-butoxymethylmethacrylamide, glycidylacrylate, glycidylmethacrylate, allylglycidylether and vinylsulphonic acid.

In amounts up to 10% (wt) at most, alkenically polyunsaturated monomers, such as triallylcyanurate, divinylmaleate, divinyladipate, vinylcrotonate and ethyleneglycoldiacrylate ester, can be used.

According to a preferred embodiment of the invention, styreneacrylate copolymer is applied as addition polymer comprising monomer units containing acid groups.

According to a further preferred embodiment of the invention the addition polymer contains at least 2% (wt) and preferably between 2% (wt) and 10% (wt), more specifically between 4% (wt) and 8% (wt) monomer units containing acid groups, relative to the addition polymer. Preferably acrylic acid and/or methacrylic acid and/or itaconic acid are used as monomer units containing acid groups. The acid used may also be phosphoric acid esters of hydroxyethyl(meth)-acrylate.

The addition polymer may be in the form of a dispersion powder or in the form of an aqueous dispersion.

As catalyst systems for the polymerization of the olefinically unsaturated monomers initiators can be used which dissolve either in the aqueous phase or in the monomer or in both. Examples of suitable types of compounds are persulphates, hydrogen peroxides, organic peroxides, such as hydroperoxides and azo compounds, whether or not in combination with reductants. Depending on the nature of the monomers and on the desired properties of the polymer and on the desired size of the polymer particles, various kinds of emulsifiers can be used either separately or in combination. Generally both anionic and non-ionic emulsifiers can be used. Optionally, protective colloids can also be used. In many cases a mixture of an anionic and a non-ionic emulsifier is the most satisfactory. A few examples of suitable classes of compounds are alkylbenzenesulphonates and alkyl ($C_{10}$–$C_{18}$) sulphates, mono/dialkylphosphates, ($C_{10}$–$C_{18}$) fatty acid salts, polyglycolethers of ($C_8$–$C_{18}$) alcohols or alkylphenols and block copolymers of ethylene oxide and propylene oxide.

The amount of emulsifier or combination of emulsifiers used depends on the type of monomer and on the type of emulsifier. Generally an amount between 0.1 and 10% (wt) is used, based on the total amount of solid, and more specifically an amount between 0.5 and 5% (wt).

The polymerization can be effected by first producing a pre-emulsion of the monomers and a part of the total amount of water and emulsifiers and subsequently starting the polymerization with the aid of a catalyst whereas the metering time of the pre-emulsion and the catalyst is between 2 and 5 hours. On the other hand it is possible to first polymerize part of the monomers in emulsion and to add more monomers stepwise, separately or mixed. In addition, it is possible to first polymerize a monomer or a combination of monomers of a certain type and to subsequently add other monomers or combinations of monomers, so that polymer particles with a laminated structure are formed. The concentration of acid groups can be different for each layer for instance with a high concentration of acid groups on the outside of the particle and a low concentration in the center of the particle. The amount of acid required may then be less than 2.0% (wt), for example between 0.5 and 1.0% (wt), based on the total polymer. A survey of various possible polymerization methods is to be found in the Netherlands patent application 7309796.

The reaction temperature during the polymerization may be between $-15°$ C. and $100°$ C., preferably between $20°$ C. and $90°$ C. If the polymerization is carried out below $0°$ C., an antifreeze like ethyleneglycol must be added.

During the polymerization other compounds may also be present, for instance chain length regulators, such as mercaptans, and buffers, such as sodium bicarbonate. In addition, substances like plasticizers, crosslinking agents, flow-promoting agents, thickeners, colourants or pigments, etc. may be present during the polymerization or be added after the polymerization. The pH of the dispersion can be adjusted with ammonia, amines or lye.

It is also possible to react part of the acid groups after the polymerization with calcium ions or zinc ions, such as calcium acetate or zinc ammonium acetate, in such a manner that at least 2% (wt), preferably 4% (wt), of acid groups remains, relative to the addition polymer.

The epoxysilane is preferably added after the polymerization of the addition polymer. The epoxysilane may, however, also be added during the polymerization. In addition, a combination of polymerizable vinylsilane and epoxysilane may be used, in which case the vinylsilane is added during the polymerization and the epoxysilane after the polymerization.

The composition according to the invention is used, for instance, as raw material for the adhesive industry, for coatings such as synthetic plastering materials, coating agents for the building industry, paints, etc.

The invention is further elucidated by means of the following examples without, however, being restricted thereto.

EXAMPLE I

A mixture consisting of an aqueous pre-emulsion of the monomers styrene, butylacrylate and acrylic acid (weight ratio 45/50/5) is polymerized at $80°$ C. with 2.5% (wt) of an anionic emulsifier (nonylphenyl 10 ethylene oxide sulphate), based on the monomers. The metering time of the pre-emulsion is 3 hours. As catalyst 0.5% by weight of ammoniumpersulfate is used.

After 2 hours' after-reaction at $85°$ C., the dispersion formed is cooled to $25°$ C. and subsequently 1.25% of 3-glycidoxypropyltrimethoxysilane (relative to the addition polymer) is added. The pH, between 2.0 and 3.0, is brought to 5.0 using ammonia. The dry substance content of the dispersion is 50%. The minimum film-forming temperature (MFT) is $16°$ C. (measured according to DIN 53787).

EXAMPLE II

The process of example I is repeated with the difference that 0.75% (wt) instead of 1.25% (wt) of 3-glycidoxypropyltrimethoxysilane is added.

EXAMPLE III

The process of example I is repeated with the difference that 2% (wt) instead of 1.25% (wt) of 3-glycidoxypropyltrimethoxysilane is added.

COMPARATIVE EXAMPLE 1

The process of example I is repeated with the difference that 1.25% (wt) of an incorporated vinyltris(2-methoxyethoxysilane) is present instead of 3-glycidoxypropyltrimethoxysilane.

EXAMPLE IV

The process of example I is repeated with the difference that the styrene/butylacrylate/acrylic acid weight ratio is 48/47/5. The amount of 3-glycidoxypropyltrimethoxysilane is 1.25%, based on the addition polymer. The MFT is $23°$ C.

EXAMPLE V

The process of example I is repeated with the difference that 8% (wt) acrylic acid is used instead of 5% (wt) acrylic acid.

COMPARATIVE EXAMPLE 2

The process of example I is repeated, but now with addition of methyltrimethoxysilane (1.25% (wt), based on the monomer) instead of 3-glycidoxypropyltrimethoxysilane.

EXAMPLE VI

The dispersion subsequently serve as the base for tile adhesives with the following compositions:

| | |
|---|---|
| Dispersions according to example I up to and including V and 1 up to and including 2 | 115 parts by weight |
| Water | 175 parts by weight |
| Methylhydroxyl cellulose thickener, Tylose MH 6000XP ex. Kalle Chemie | 3.7 parts by weight |
| Antifoam, Hercules 1512 M, ex Hercules | 1.0 parts by weight |
| Fungicide, Formalin | 2.7 parts by weight |
| Butylglycolacetate film former, ex UCC | 5.8 parts by weight |
| Quartz powder, Snowwhite, LZM, MOSA Maastricht | 676 parts by weight |
| Titanium white, Kornos A, ex Kronos Titan GmbH | 14 parts by weight |

This composition is mixed for ten minutes, upon which 8 parts by weight of 2-amino-2-methylpropanol 95% (ex Angus GmbH) and water are added in a weight ratio of 1:1.

Of these tile adhesives the tensile strength is determined with the aid of ceramic tiles, 5×5 cm, glued to concrete tiles (DIN 18156). Tile adhesives of a good dispersion may be required to have a wet tensile strength of at least 0.50 N/mm².

| | Result: Tensile strength | |
|---|---|---|
| | dry in N/mm² | wet in N/mm² |
| I | 2.32 | 0.80 |
| II | 1.76 | 0.58 |
| III | 2.20 | 0.83 |
| 1 | 1.98 | 0.41 |
| IV | 2.79 | 1.44 |
| V | 2.59 | 0.59 |
| 2 | 1.57 | detached |

These examples show that the tensile strength requirement is complied with excellently by the addition, to the addition polymer according to the invention, of an epoxysilane according to the invention.

We claim:

1. An adhesive composition based on an aqueous dispersion of a styrene-acrylate polymer and a silicon compound, said polymer consisting of between 4% by weight and 8% by weight monomer units containing acid groups, and said silicon compound being an epoxysilane having the formula:

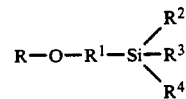

wherein in said formula:
R is epoxy alkyl ($C_1$-$C_4$),
$R^1$ is alkyl ($C_1$-$C_4$) or phenyl,
$R^2$ is alkoxy ($C_1$-$C_4$), alkyl ($C_1$-$C_4$) or phenyl,
$R^3$ and $R^4$ are alkoxy ($C_1$-$C_4$) or OH.

2. The composition according to claim 1, wherein 0.1-5% (wt) of epoxysilane is used, relative to the polymer.

3. The composition according to claim 1, wherein the epoxysilane is an epoxysilane is an epoxysilane having the formula:

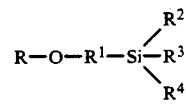

wherein in said formula:
R is epoxyalkyl ($C_1$-$C_4$),
$R^1$ is alkyl ($C_1$-$C_4$),
$R^2$, $R^3$ and $R^4$ are alkoxy ($C_1$-$C_4$).

4. The composition according to claim 1, wherein the epoxysilane used is 3-glycidoxypropyltrimethoxysilane.

5. The composition according to claim 1, wherein the epoxysilane is added at a pH between 1.5 and 8.

* * * * *